United States Patent [19]

Baiuley et al.

[11] Patent Number: 4,987,639
[45] Date of Patent: Jan. 29, 1991

[54] FRANGIBLE FASTENING CONSTRUCTION FOR HANDLES AND METHOD OF FASTENING

[75] Inventors: David E. Baiuley, Anaheim; Josef E. Bingisser, Santa Ana, both of Calif.

[73] Assignee: Ropak Corporation, Fullerton, Calif.

[21] Appl. No.: 293,888

[22] Filed: Jan. 5, 1989

[51] Int. Cl.⁵ .............................................. B65D 25/28
[52] U.S. Cl. ...................... 16/126; 16/127; 16/222; 16/381; 16/386; 16/DIG. 24; 29/418; 403/2; 220/94 R; 411/41; 411/508
[58] Field of Search ............... 16/270, 272, 380, 381, 16/386, DIG. 13, 126, DIG. 24, 40, 41, 123, 124, 125, 127, 222; 411/39, 40, 41, 42, 43; 403/2, 405.1, 408.1; 29/418; 190/39, 115; 220/94 R

[56] References Cited

U.S. PATENT DOCUMENTS

| 2,956,468 | 10/1960 | Macy | 411/41 |
|---|---|---|---|
| 3,643,755 | 2/1972 | Gonet et al. | 16/222 |
| 4,043,001 | 8/1977 | Parsons | 16/222 |
| 4,507,821 | 4/1985 | Jorgensen | 16/126 |
| 4,579,473 | 4/1986 | Brugger | 411/41 |
| 4,648,766 | 3/1987 | Wollar | 411/41 |
| 4,713,861 | 12/1987 | Bancroft | 16/222 |
| 4,766,643 | 8/1988 | Salazar | 16/222 |

FOREIGN PATENT DOCUMENTS

| 101652 | 2/1984 | European Pat. Off. | 16/127 |
|---|---|---|---|
| 48759 | 4/1977 | Japan | 411/41 |
| 1443123 | 7/1976 | United Kingdom | 411/41 |
| 2145993 | 4/1985 | United Kingdom | 220/94 R |

Primary Examiner—Richard K. Seidel
Assistant Examiner—Edward A. Brown
Attorney, Agent, or Firm—Thomas P. Mahoney; J. Mark Holland

[57] ABSTRACT

A fastening pin, or peg is partially inserted into an aligned aperture and attached thereto by a webbed flashing. In a one-step assembly operation, the pin is driven further into the aperture as the flashing is broken and driven through an aligned aperture of a second component.

12 Claims, 2 Drawing Sheets

FRANGIBLE FASTENING CONSTRUCTION FOR HANDLES AND METHOD OF FASTENING

BACKGROUND OF THE INVENTION

The present invention relates to fastening constructions, and more specifically to a technique for manufacturing a fastener and a component having a hole for receiving the fastener, and a technique for assembling the fastener to the component.

In the container industry, many types of fasteners are used in the assembly of containers, including the attachment of container lids and handles. In one arrangement for connecting a handle to a container, the container is provided with a lug having a hole therethrough and the handle has a pair of mating apertured legs for receiving a bolt, clip, pin or some other form of fastener that permits the handle to pivot. In assembly, the handle legs are positioned straddling the lug with the holes aligned, and the fastener is then inserted, often times by force, through the legs and the lug. The fastener is secured in position by a locking mechanism, thereby hinging the handle to the container.

In one manufacturing technique, handles and fasteners of this nature made of plastic are formed together in a single unit with the handles and fasteners attached by flashing around the periphery of each individual piece. By breaking the pieces away from the flashing, the handles and fasteners are detached into separate pieces. Because fasteners are often lost in assembly, extra fasteners are formed, resulting in an increase in production costs. When the handle is attached to a container, the fastener, separated from the handle is inserted through the handle legs and the container lug with the components held in aligned position.

A need exists for an improved technique which will simplify the assembly of container lids or handles or other such components.

SUMMARY OF THE INVENTION

Briefly, the present invention comprises a fastening construction having a fastening pin, or peg, partially inserted or aligned to be inserted into a hole in a component and attached thereto by frangible means such as a webbed flashing. When the component, such as a handle, is to be attached to a second component, such as a container, the components are positioned with pin securing holes aligned, and the pin is then fully inserted in the holes. The flashing is broken as the components are joined. Thus, the fastening construction, because of the partial preinsertion into or alignment with the receiving aperture to which it is to be fastened, promotes an easy and efficient one-step assembly operation. Because the fastening pin is molded as part of the item to be assembled, and because it is only broken away from the item in assembly, the risk of losing the fastener is eliminated. The fastening construction of the present invention is ideal for use in the container industry for securing handles or lids to the containers. It is also useful in the molding and assembling of components of other structures.

DETAILED DESCRIPTION OF THE PREFERRED EMBODIMENT

Figure 1:
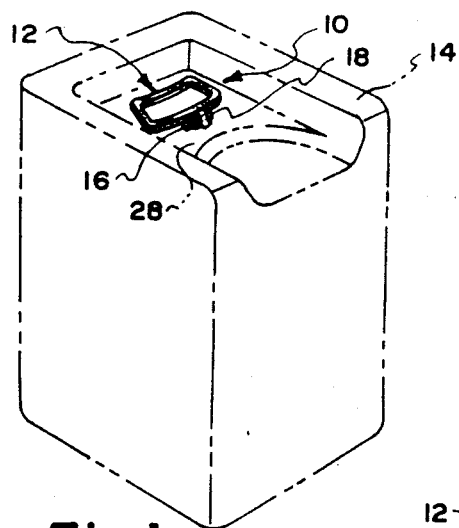
FIG. 1 is a perspective view of a container, having a handle attached thereto utilizing the construction of the invention.
Figure 2:
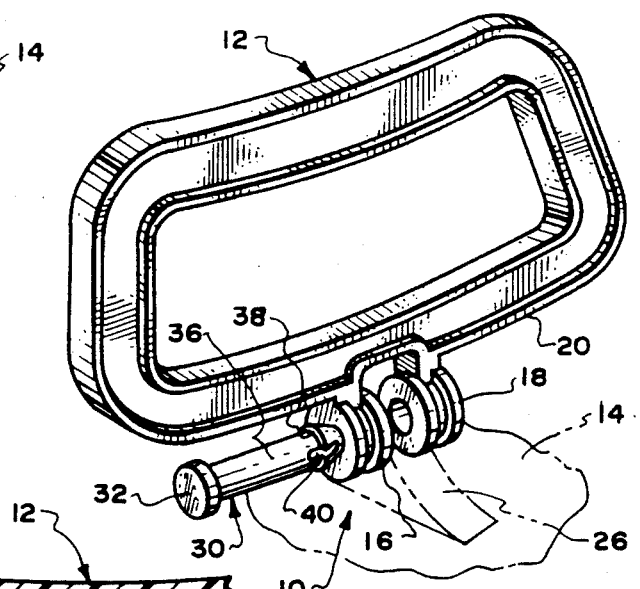
FIG. 2 is a perspective view of a handle and fastener construction of the present invention in a preferred form.
Figure 3:
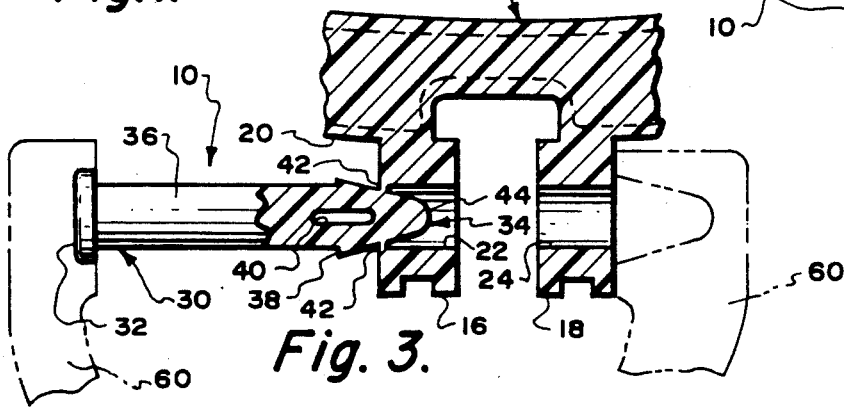
FIG. 3 is a partial cross-sectional view showing the alignment and webbed connection of the handle and fastening pin with a tool for installing the pin.

Referring to the drawings, there is shown at 10 in FIG. 1, a preferred form of a fastening construction used to secure a handle 12 to a container 14. As more clearly illustrated in FIG. 2, a pair of rounded, spaced pivot lugs, or legs 16 and 18, are preferably molded integrally with a lower edge 20 of the handle 12. Each pivot leg 16, 18 has a circular hole or aperture 22, 24, respectively, which are longitudinally aligned, as seen in FIG. 3. The pivot legs are adapted to straddle an apertured lug 26 formed integrally with the top wall 28 of the container 14, and will receive a fastening pin 30 which also extends through the apertures 22, 24 to secure the handle to the container. In accordance with the invention, the pin 30 is molded integrally with the handle, and axially aligned with the hole 22 of the leg 16. Further, in the arrangement shown, the top of the pin is partially inserted in the hole.

FIG. 3, illustrates, in partial cross-section, the fastening construction 10 of the present invention in a preferred form. The fastening pin 30 is bullet shaped, having a flanged head 32, a conical nose 34 and an elongate cylindrical body segment 36 disposed therebetween. The body 36 is sized slightly smaller than the apertures 22, 24 through which it passes, so as to allow free rotation of the handle 12 about the longitudinal axis of the pivot legs 16, 18.

Figure 4:
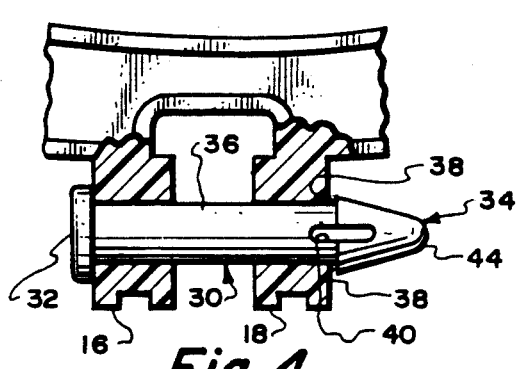
FIG. 4 is an elevational view in partial cross section showing the locking attachment of the fastening pin through its associated, longitudinally aligned, handle legs.

The flanged head 32 is larger than the leg aperture 22, to prevent the pin from passing entirely through the aperture. The larger diameter end of the nose forms shoulders or barbs 38 at the juncture between the nose and the body. The nose 34 has an internal deformation slot 40 adapted to allow the shoulders 38 to be biased radially inwardly, so as to facilitate passage of the fastening pin through the apertures. The shoulder juncture is not quite circular, but instead has a dimension about equal to the diameter of the body 36 along the length of the slot 40 because the slot does not deform in that direction. The shoulder dimension is larger in the direction perpendicular to the slot axis, as the slot permits deformation in that direction and requires a small amount of space to accommodate the deformed shoulder. As illustrated in FIG. 4, once the pin is through the apertures 22, 24 and the handle 12 secured to the lug 26 of the container, the shoulders or barbs 38 spring back to the original shape, thereby securing the fastening pin 30 in place.

The pin thus becomes the hinge pin for the handle and cannot be removed without breaking it. This feature of the pin is advantageous in that one can tell if the container has been tampered with in that area.

As illustrated in FIG. 3, the fastening pin 30 is secured to the pivot leg 16 by frangible or break-away means in the form of a thin webbed flashing 42 disposed around the nose 34, intermediate the tip 44 of the nose and the shoulder 38. As seen, the radially inner edge of the flashing is joined to the nose, and the radially outer edge is joined to the annular entry end of the aperture 22 in the leg 16. Preferably, the nose 34 is partially inserted into the pivot leg 16 with the fastening pin axis already in alignment with the longitudinally aligned apertures 22, 24. Molding the pin 30 and leg 16 as an integral unit prevents loss of interconnecting parts. The fastening construction 10 of the present invention is preferably formed of a suitable plastic, however it is also contemplated to make such connectors out of thin metals such as aluminum, tin or the like, as well as wood.

The webbed flashing 42 securing the nose 34 of the fastening pin 30 to the pivot leg 16 greatly helps the assembly of the handle 12 to the container 14. Because the pin is already aligned, the handle legs need only be placed over the container lug 26 and the fastening pin 30 forced through the apertures 22, 24 with the jaws 60 of a crimping tool to secure the handle to the container. The frangible means 42 is easily broken in this operation. This technique greatly simplifies assembly in that it eliminates the need to separately hold and align the pin.

While the pin 30 is illustrated initially joined to the handle, this could be reversed with two lugs and the pin being initially joined and a single lug being formed on the handle.

Figure 5:
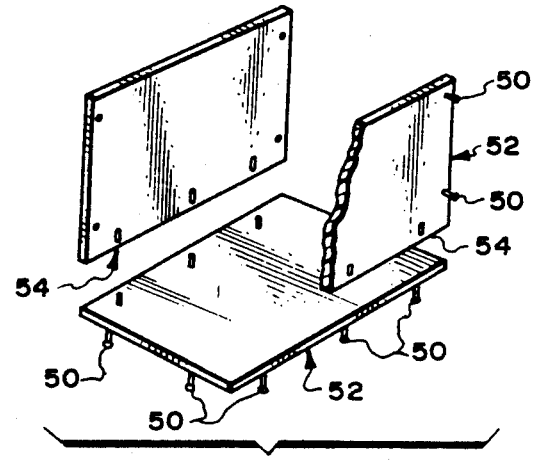
FIG. 5 is a schematic, exploded partially sectionalized view of a box employing the technique of the present invention to assemble the sides of the box.
Figure 6:
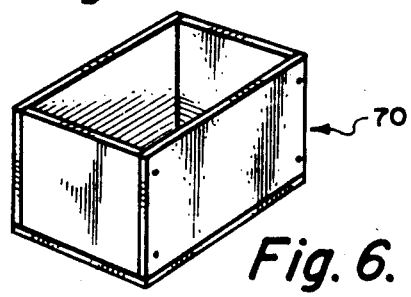
FIG. 6 is a perspective view of the assembled box of FIG. 5.

In addition to being useful in the fixation of handles to containers, the fastening construction of the present invention may also be employed in the assembly of many other components in many industries. Boxes are one example, and FIG. 5 illustrates the construction used in the assembly of a box. Fastening pins 50 are partially inserted into aligned apertures around the periphery of box walls 52 to be assembled. The fasteners 50 are secured within their respective apertures by a webbed flashing in a manner similar to that illustrated in FIG. 3. Mating edges on an adjacent wall are provided with apertures 54 spaced and aligned to receive the pins 50. With the adjacent wall edges properly positioned, the pins are driven into their respective mating apertures 54 and separated from their molded positions in a single operation. The pins may be provided with barbs or other various means (not shown) to help maintain them in the installed position. An open carton 70 assembled in this manner is illustrated in FIG. 6. The assembly of the carton, due to the attached fasteners 50, is simplified by minimizing the number of steps involved in connecting the carton walls together.

Figure 7:
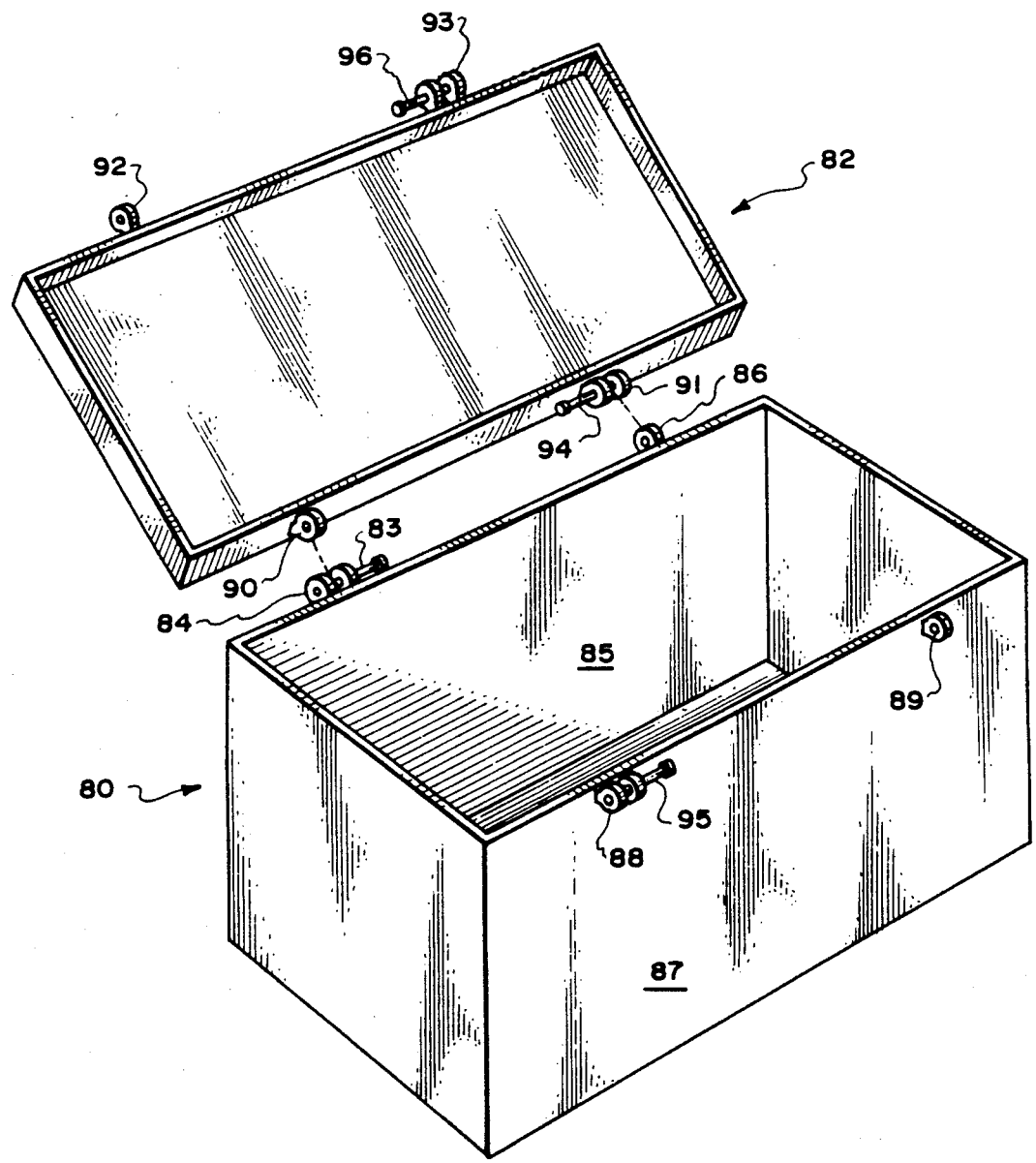
FIG. 7 is an exploded, perspective view of a box wherein the technique of the present invention is used to hinge a lid to a box and to hold the lid closed.

FIG. 7 shows a box 80 utilizing the fastening construction of the invention to attach a lid 82 to the box and to lock the lid in closed position. More specifically, a fastening hinge pin 83 is joined in an aligned position with the holes in a pair of lugs 84 mounted on the left upper edge of the back wall 85 of the box. A single lug 86 is mounted on the upper edge of the wall spaced from the pair of lugs 84. A similar arrangement of lugs 88 and 89 is shown on the front wall 87. A reverse lug arrangement is shown on the lid 82 to cooperate with the box lugs. That is, the rear edge of the lid has a single lug 90 to fit between the box lugs 84, and a pair of lugs 91 to straddle the box lug 86. Likewise the front edge of the lid has a single lug 92 to fit between the box lugs 88, and a pair of lugs 93 to straddle the lug 89. The box lugs 84 and 86 and the mating lid lugs 90 and 91 together with the pins 83 and 94, form a hinge for the box, while the other lugs 88, 89, 92 and 93, with pins 95 and 96 form locked hasps for the box. To open the box it is necessary to break the pins or their supporting lugs. Thus, tampering or unauthorized opening of the box will be evident. Of course the pairs of lugs can be formed on either the box or the lid, in the various combinations.

Although only three forms of the invention have been illustrated and exemplified, it will be apparent to those skilled in the art that various modifications may be made therein without departing from the spirit of the invention or from the scope of the appended claims.

What is claimed is:

1. A fastening construction for securing items together, comprising:
   a fastening pin, having a body with a nose at one end;
   means for receiving said pin; and
   frangible means supporting said pin axially aligned with and close to said receiving means;
   wherein said frangible means is a flashing formed in molding said pin and said receiving means, and said frangible means is easily broken upon driving said pin further into said receiving means, and further wherein said means for receiving is a lug of a handle or lid, having an aperture formed therein.

2. The construction of claim 1, wherein said handle or lid is secured to a container by said fastening pin.

3. The construction of claim 1, wherein said frangible means joins said nose to a wall of said receiving means.

4. The construction of claim 1, further comprising means for securing said fastening pin in said receiving means after said frangible means has been broken and the pin has been driven further into said receiving means.

5. A fastening construction, as defined by claim 4, wherein said securing means comprises a shoulder, formed at the juncture of said nose and said body.

6. The construction of claim 5, wherein said pin includes an internal deformation slot in the area of said shoulder that permits said nose to fit through said aperture.

7. The construction of claim 1, wherein said pin and frangible means are formed from plastic.

8. The construction of claim 1, wherein said pin is initially partially within said receiving means.

9. A fastening construction for securing a handle to a container comprising:
   a bullet shaped pin, having a flanged head portion, a conical nose and an elongate cylindrical body;
   a pair of longitudinally aligned pivot legs, on an edge of said handle, each of said pivot legs having a longitudinally aligned aperture extending therethrough; and
   a thin webbed flashing attaching and aligning said pin at least partially within one of said pivot legs, said flashing being adapted to be broken away when the pin is driven through said aperture.

10. A method of securing a handle to a container, comprising the steps of:
    providing a handle having one or more pivot lugs disposed along an edge thereof, to mate with one or more lugs on the container, wherein one of said pivot lugs is provided with a fastening pin which is partially inserted or aligned to be inserted in one of said pivot lugs and attached thereto by a thin flashing;

aligning said pivot lugs of said handle with said container lugs; and breaking the attachment of said flashing to said pin by forcing said fastening pin through said pivot lugs so as to secure said handle to said container.

11. The method of claim 10, wherein said pin has a nose and a body and shoulder at the junction of said nose and said body to hold said pin in position after the pin nose has been driven through said aperture and said breaking step includes driving said pin nose through said apertures.

12. The method of claim 11, wherein said pin includes an internal deformation slot in the area of said shoulder that permits said nose to fit through said aperture, and said breaking stp includes deforming said nose as it is driven through said aperture.

* * * * *

UNITED STATES PATENT AND TRADEMARK OFFICE
CERTIFICATE OF CORRECTION

PATENT NO. : 4,987,639

DATED : January 29, 1991

INVENTOR(S) : David E. Bailey, Josef E. Bingisser

It is certified that error appears in the above-identified patent and that said Letters Patent is hereby corrected as shown below:

On the title page, under item [19] and in item [75]:
The Inventor's name is misspelled. "Baiuley" should be "Bailey."

Column 6, Line 9 - "stp" should be "step."

Signed and Sealed this

Twenty-first Day of May, 1991

*Attest:*

HARRY F. MANBECK, JR.

*Attesting Officer*  *Commissioner of Patents and Trademarks*